United States Patent [19]

Insetta et al.

[11] Patent Number: 4,953,273
[45] Date of Patent: Sep. 4, 1990

[54] PROCESS FOR APPLYING CONDUCTIVE TERMINATIONS TO CERAMIC COMPONENTS

[75] Inventors: Victor D. Insetta; Richard V. Monsorno, both of Jacksonville, Fla.; John F. Dorrian, Simpsonville, S.C.

[73] Assignee: American Technical Ceramics Corporation, Huntington Station, N.Y.

[21] Appl. No.: 356,518

[22] Filed: May 25, 1989

[51] Int. Cl.$^5$ .............................................. H01G 4/12
[52] U.S. Cl. ...................................... 29/25.42; 29/854; 264/61; 361/309; 361/321 C
[58] Field of Search .................. 29/25.42, 854–856; 361/308, 309, 321 C, 321 CC; 284/61, 62

[56] References Cited

U.S. PATENT DOCUMENTS

| | | | |
|---|---|---|---|
| 4,241,378 | 12/1980 | Dorian | 29/25.42 X |
| 4,353,153 | 10/1982 | Prakash | 29/25.42 |
| 4,652,967 | 3/1987 | Sakabe et al. | 29/25.42 X |

FOREIGN PATENT DOCUMENTS 137565  4/1985  European Pat. Off. .

Primary Examiner—Carl E. Hall
Attorney, Agent, or Firm—Edward H. Loveman

[57] ABSTRACT

In this process a conductive first layer composed of finely divided metal and finely divided ceramic material in an organic carrier is applied to a surface of an unsintered ceramic body. The conductive layer forms terminations when the body, and the conductive layer are cofired to sinter and form a unitary, integral, monolithic structure. A second conductive metal layer may be applied to the first layer prior to cofiring to improve attachment capabilities of the component. Leads may be attached to the conductive terminations if desired.

18 Claims, 1 Drawing Sheet

PROCESS FOR APPLYING CONDUCTIVE TERMINATIONS TO CERAMIC COMPONENTS

BACKGROUND OF THE INVENTION

1. Field of the Invention

This invention relates to the art of manufacturing ceramic components and more particularly concerns an improved process for applying conductive paths or conductive terminations to ceramic components such as capacitors.

2. Description of the Prior Art

In prior U.S. Pat. No. 3,235,939 issued Feb. 22, 1966 and reissued as U.S. Pat. No. Re.26,421 on July 2, 1966, there is described processes for manufacturing a miniature ceramic capacitor some of which are currently used in the art.

One such process utilizes a finely divided metallic electrode which is applied to a strip or sheet of unsintered ceramic. Then a multiplicity of these coated and uncoated sheets are assembled one above the other in the correct sequence and orientation. The assembly is cut into individual pieces, the pieces compressed under a pressure and then fired to sinter the ceramic. After the firing, a termination material composed of finely divided metal in an organic carrier, is applied to the exposed electrode ends of the ceramic capacitors, thereby forming the terminations. The capacitors are then brought to a sufficient temperature to fuse the terminations to the body of the capacitor. Terminal leads may then be attached (soldered, brazed, welded, etc.) to the conductive terminations.

In the above described prior art process, a number of difficulties result from the method of forming the terminations. One of the principal difficulties is that there may be poor adhesion of the terminations to the ceramic body of the capacitor, so that contact is often tenuous between some electrodes of the capacitor and the fired terminations, whereby the electrical parameters of the capacitor may vary in an unpredictable and erratic manner.

Another principal difficulty of this prior art process is that since the second firing must be at a lower temperature than the first firing, the maximum operating temperature of the capacitor is decreased to the lower temperature of the second firing. In another prior art process, currently in use, the termination material is coated after the first firing, and is comprised of a finely divided metal and finely divided glass particles (frit) in an organic liquid or paste. Although the glass frit improves adhesion, it frequently diminishes solderability of electric connections, and due to the glass content, is brittle and therefore, easily broken and exhibits poor thermal shock. In addition, the metals commonly used in the terminations tend to dissolve (leach) into the solder used in the terminal lead attachment. If the second firing used to fuse the glass frit is performed at a temperature equal to or higher than that of the first firing, then the termination layer is is likely to separate from the ceramic capacitor.

In order to improve the performance of the terminations made with glass frit, a metal plating process is sometimes used to complete and enhance the termination layer of a ceramic component. This plating process may introduce further difficulties in that strong solutions are used, which etch the glass frit and ceramic, causing nonuniform interfaces between the terminations and the ceramic bodies, again leading to a degradation of the joint, both mechanically and electrically. Additionally, capacitor performance may be degraded by trapped plating solutions or other foreign contaminants introduced during the plating process. The net result is that the capacitors are compromised and integrity of the device is lost. In the prior U.S. Pat. No. 3,235,939 abovementioned, it was proposed to apply the finely divided metallic terminations to the green, ceramic capacitors as an economy measure prior to sintering the ceramic. However, again poor adherence of the metal terminations to the capacitor bodies was experienced, and unacceptable changes in expected capacitor parameters resulted. In another prior art process, disclosed in U.S. Pat. No. 4,246,625 entitled "Ceramic Capacitors with Co-fired End Terminations", the end terminations are composed of finely divided particles of either nickel or copper together with glass frit and mangenese dioxide, in which end terminals are co-fired with the capacitor body. Termination ends of this type, which contain glass frit, suffer from the same deficiency as mentioned hereinabove, i.e. diminished solderability of connections etc.

SUMMARY OF THE INVENTION

It is therefore a principal object of the present invention to provide a method or process of forming a reliable conductive termination or conductive paths for ceramic electronic components such as capacitors, resistors, hybrids, etc, which avoids the difficulties and disadvantages heretofore experienced with prior art methods of applying terminations. According to the invention, after individual ceramic components such as a capacitor are fabricated in an unsintered state, a termination layer composed of a mixture of finely divided metal and ceramic of the same or similar composition as that of the ceramic capacitor,in a liquid or paste organic carrier, is applied to the exposed electrode sides of the capacitor pieces. Then the capacitors are sintered at their normal firing temperature. During the sintering process, the ceramic in the termination layer is simultaneously sintered to the capacitor body by solid state reactions and forms an integral mechanical bond, which results in a monolithic co-fired termination. Excellent electrical conductivity between every electrode of the capacitor and the sintered termination is achieved with the metal composition in the termination layer. The termination layer requires the proper ceramic to metal composition in order to achieve optimum characteristics. If the composition of the termination layer is the same as the ceramic in the body, the ceramic in the termination layer is typically from 10% to 60% ceramic by volume in the ceramic-metal composition. If less electric conductivity is permissible of the ceramic component, then the percentage of ceramic may be increased to as much as 75% by volume. If the type of ceramic in the termination layer differs from the ceramic body through the use of flux compounds, such as high temperature glasses or clays, for example, steatite, then the composition of ceramic by volume of the termination layer may be reduced to as low as 2%.

When the higher percentages of ceramic are used, to enhance physical performance, solderability of the termination layers is reduced. To compensate for this condition, additional layer of finely divided metal with a lesser percentage of ceramic or without ceramic is applied over the initial ceramicmetal termination layer, prior to any sintering process. The capacitor and termination layers are then sintered, as defined, into a monolithic integral unit. This cofiring technique solves the prior art problems of poor adherence, poor solderability, unstability of electrical performance, and other difficulties heretofore encountered.

These and other objects and many of the attendant advantages of this invention will be readily appreciated as the same becomes better understood by reference to the following detailed description when considered in connection with the accompanying drawings in which:

DESCRIPTION OF THE PREFERRED EMBODIMENTS

Figure 1:
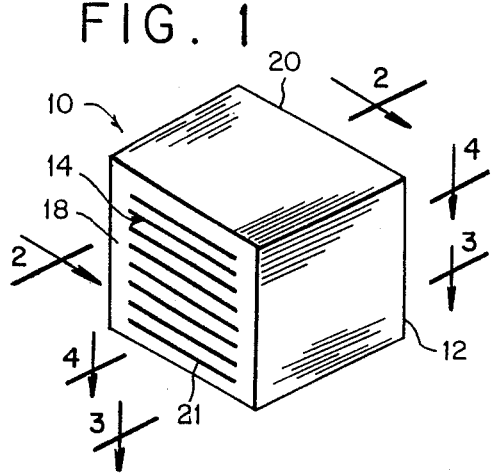
FIG. 1 is a greatly enlarged perspective view of an unfired ceramic capacitor unit with spaced electrodes having exposed edges, at one stage of manufacture of the capacitor.
Figure 2:
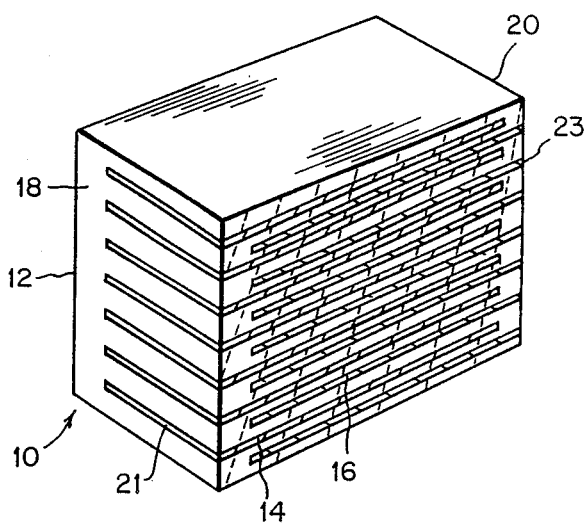
FIG. 2 is a further enlarged cross sectional perspective view taken along line 2—2 of FIG. 1.

Referring now to the drawings wherein like reference characters designate like or corresponding parts throughout, there is illustrated in FIGS. 1-4, a capacitor generally designated as reference numeral 10 at one stage of manufacture. The capacitor 10 has a ceramic body or block 12 composed of unsintered ceramic material. In the rectangular body 12 are spaced metallic layers 14, 16 alternately terminating at opposite ends on sides 18, 20 of the body 12. The body 12 is produced by vertically assembling a plurality of sheets into an assembly, compressing the assembly, as explained in detail in the abovementioned U.S. Pat. No. 3,235,939, and cutting the assembly into the individual parts or bodies 12.

Now according to the invention, the sides 18 and 20 of the body 12 are coated with thin layers 22, 24 as shown in FIG. Each of the layers 22, 24 is composed of finely divided metal such as platinum, palladium, gold, etc. mixed with a ceramic material, preferrably of the same or a substantially similar composition as that of the ceramic body 12, in a conventional organic liquid or paste form. The layers 22, 24 are usually not more than 0.001 inches thick and may cover the entire sides 18, 20, and overlap unto the body 12 or only parts of these sides sufficiently to cover an exposed end or edge 21, 23 of the respective electrode 14, 16.

Figure 5:
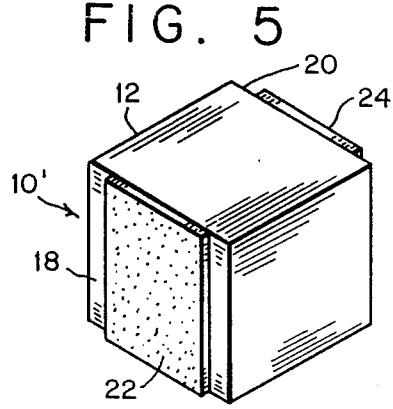
FIG. 5 is a perspective view of the ceramic capacitor unit of FIG. 1 with termination layers applied prior to cofiring.
Figure 3:
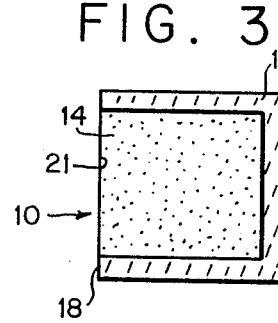
FIG. 3 and FIG. 4 are horizontal sectional views taken along lines 3—3 and 4—4 repectively of FIG. 1.
Figure 4:
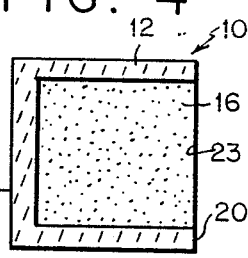
Figure 7:
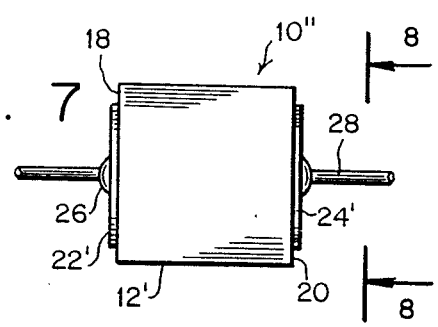
FIG. 7; is a side view of the capacitor unit of FIGS. 5 or 6 after firing and application of terminal leads.

At this stage, the capacitor 10' shown in FIG. 5 may be fired to cure the ceramic block on body 12, electrodes 14, 16 and layers 22, 24 to form the monolithic-,integral capacitor structure 10" shown in FIG. 7. Then at a next stage, solder 26 may be applied to outer sides of the cured termination layers 22', 24', and leads 28 applied to complete the capacitor 10".

Figure 6:
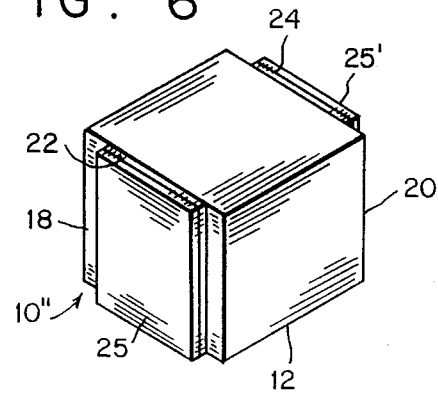
FIG. 6 is a view similar to FIG. 5 showing the unit of FIG. 5 with additional termination layers applied prior to cofiring.
Figure 8:
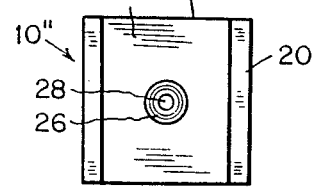
FIG. 8 is an end view of the completed capacitor unit taken along line 8—8 of FIG. 7.

As an alternative, the layers 22, 24 may each be coated with thin layers 25 and 25', shown in FIG. 6, prior to cofiring, in order to improve the performance or to customize the capacitor terminations. The layers 25, 25' are composed of finely divided metal, with or without ceramic, in an organic liquid or paste form. After cofiring, the layers 22, 24, 25, and 25' will be integrated with each other and with the sides of the ceramic 30 block or body 12' and with the electrodes 14, 16. Thereafter, solder 26 and leads 28 may be applied to the capacitor terminations 22', 24' to complete the assembly of the capacitor 10" as shown in FIGS. 7 and 8.

If it is desired to improve the cutting of the assembly of unsintered ceramic layers, after compressing the layers as referred to above and in the abovementioned U.S. Pat. No. 3,235,939, the assembly may be heat treated to coalesce the particles and remove the binder, which more easily permits the assembly to be put into blocks 12 by saws or knives. Insofar as the present invention is concerned, the ceramic body of the block 12 whether unfired or partially fired to remove the binder, the body will still be unsintered so that the layers 22, 24, 25 and 25' will integrate with the block or body 12 and the electrodes 14, 16 after they are cofired.

Although the invention has been explained in connection with a multiple layered capacitor it is possible to apply the same process to a capacitor having a single, unsintered ceramic body, such as the capacitor illustrated in U.S. Pat. No. 4,205,364. The termination layers composed of a mixture of ceramic material and a finely divided metal for the primary layer, and if required and finely divided metal, with or without the ceramic composition in the second layer, will be applied, and cofired with the ceramic body 12 and its electrode as explained above with regard to FIGS. 5 and 6. Then the capacitors may also receive the addition of the solder joints and/or leads as explained in connection with FIGS. 7 and 8.

It is preferable that the composition of the termination layer or conductive path be the same as the ceramic composition of the body 12, and in this event the ceramic in the termination layer is typically 10% to 60% ceramic by volume. If the component is a resistor or other resistive component or if less electric conductivity is permissible of the ceramic component, then the percentage of ceramic to metal in the termination layer or conductive path may be increased to as much as 75% by volume. Additionally, if the ceramic in the termination layer or conductive path differs from that of the ceramic in the body through the use of a flux agent, then the percentage of ceramic to metal in the termination layer may be reduced to as low as 2% by volume.

It should be understood that although the invention has been illustrated and explained in connection with capacitors, the process is equally applicable to other ceramic electronic components such as resistors, inductors, networks, hybrids, etc. The aforementioned process when used in hybrids may be applied to form conductive paths so that the completed hybrid looks very much like a printed circuit board to which electronic components may be subsequently applied.

It should also be understood that the foregoing relates to only a preferred embodiment of the invention which has been by way of example only, and that it is intended to cover all changes and modifications of the examples of the invention herein chosen for the purpose of the disclosure, which do not constitute departures from the spirit and scope of the invention.

What is claimed is:

1. A process for applying a plurality of conductive paths on the exterior of a ceramic component having an unsintered ceramic body comprising the steps of:
   applying said paths to said body said paths being composed of only a finely divided metal, and finely divided ceramic particles substantially the same as the ceramic of said body, in an organic carrier;
   applying a termination layer over said paths, said termination layer having finely divided metal in a liquid carrier and finely divided ceramic particles of substantially the same ceramic as that of said body; and
   cofiring said body, said paths and said termination layer to integrate the same into a monolithic integral unit.

2. A process as defined in claim 1 wherein said ceramic component is a capacitor.

3. A process as defined in claim 1 wherein said conductive paths are composed of a ceramic to metal composition substantially in the range of 10% to 60% by volume.

4. A process as defined in claim 1 wherein said ceramic component is a resistor and and said conductive paths are composed of a ceramic to metal composition substantially in the range of 30% to 75% by volume.

5. A process as defined in claim 1 wherein said finely divided ceramic of said paths differs from said body through the use of flux compounds and said paths are composed of a ceramic to metal composition substantially in the range of 2% to 10% by volume.

6. A process of manufacturing a capacitor, comprising the steps of:
   making a body of unsintered ceramic material containing thin spaced electrodes composed of finely divided metallic material having exposed edges at spaced sides of said body;
   applying a conductive layer to said spaced sides of said body to cover and connect electrically said exposed edges of said electrodes, said layer being comprised of a mixture, said mixture composed of only a finely divided metal, finely divided ceramic particles, and an organic liquid carrier; and
   cofiring said body, electrodes and layers to integrate the same into a monolithic, integral unit, so that said layers form conductive terminations of said electrodes.

7. A process as defined in claim 5 wherein said ceramic of said mixture is substantially the same as the ceramic of said body.

8. A process as defined in claim 5, wherein said ceramic particles are substantially in the range of 10% to 60% by volume of said mixture exclusive of said carrier, to insure that said layers integrate completely with said body and electrodes upon being fired.

9. A process as defined in claim 5, comprising the further step of attaching leads to said conductive terminations to complete said capacitor.

10. A process of manufacturing a capacitor, comprising the steps of:
    making a body of unsintered ceramic material containing spaced electrodes composed of finely divided metallic material and having exposed edges at spaced sides of said body;
    applying a first termination layer to said sides of said body to cover and connect electrically said exposed edges of said electrodes, said layer being composed of a mixture of finely divided metal, finely divided ceramic particles, and a liquid organic carrier;
    applying a second termination layer onto said first layer, said second layer being composed of finely divided metal and a liquid organic carrier; and
    cofiring said body, electrodes, first and second layers to integrate the same into a monolithic, integral unit, so that said integrated first and second layers form conductive terminations of said electrodes.

11. A process as defined in claim 9, wherein said ceramic particles of said first termination layer are substantially in the range of 10% to 60% by volume of said mixture exclusive of said carrier, to insure that said first and second layers integrate completely with each other and with said body and said electrodes upon being fired.

12. A process as defined in claim 9 wherein said second termination layer contains ceramic particles up to 60% by volume exclusive of said carrier.

13. A process as defined in claim 9, comprising the further step of attaching leads to said conductive terminations to complete said capacitor.

14. A process of manufacturing capacitors comprising of steps of:
    making a body from an assembly of strips of unsintered ceramic material containing spaced first layers of finely divided metallic material;
    underfiring said body to coalesce particles and remove the binder;
    cutting said body to form a multiplicity of blocks with said first layer constituting electrodes with edges exposed at sides of said blocks;
    applying conductive second layers to sides of each of said blocks to cover and connect electrically said exposed edges of said electrodes, said second layers being composed of a only a mixture of finely divided metal, finely divided ceramic particles, and a liquid organic carrier; and
    cofiring said block, electrodes and second layers to integrate the same into a monolithic, integral unit, and so that said second layers form conductive terminations of said electrodes.

15. A process as defined in claim 14, comprising the further step of applying to said second layers, prior to cofiring, third layers comprised of metallic material to render leads readily attachable to said third layers.

16. A process a defined in claim 14, wherein said ceramic particles of said second layers are substantially in the range of 10% to 60% by volume of said mixture exclusive of said carrier to insure that said electrodes and said second layers integrate completely with each other and with said block upon being cofired.

17. A process as define in claim 14 wherein said third metallic layers include finely divided ceramic particles.

18. A process as defined in claim 14, comprising the further step of attaching leads to said second layers to complete said capacitor.

* * * * *